United States Patent
Orlando

[11] 3,883,885
[45] May 13, 1975

[54] HIGH-SPEED SHUTTER
[76] Inventor: Carl Orlando, 47 Willow Rd., New Shrewsbury, N.J. 07724
[22] Filed: Dec. 4, 1973
[21] Appl. No.: 421,551

[52] U.S. Cl. ............................. 354/258; 354/266
[51] Int. Cl. ................................................ G03b 9/10
[58] Field of Search .......... 354/250, 251, 252, 245, 354/246, 255, 256, 258, 266, 267, 48, 50, 354/51, 60; 337/393, 395

[56] References Cited
UNITED STATES PATENTS

| | | | |
|---|---|---|---|
| 517,164 | 3/1894 | Lightford | 354/255 |
| 3,122,080 | 2/1964 | Camm | 354/246 |
| 3,200,723 | 8/1965 | Topaz | 354/50 X |
| 3,403,238 | 9/1968 | Buehler et al. | 337/393 |
| 3,502,010 | 3/1970 | Kennel | 354/51 |
| 3,652,969 | 3/1972 | Willson et al. | 337/393 |
| 3,725,835 | 4/1973 | Hopkins et al. | 337/393 |

*Primary Examiner*—Joseph F. Peters, Jr.

[57] ABSTRACT

A high speed photographic shutter is activated by the tensile force exhibited by a prestretched wire of 55-Nitinol joined to the shutter as the wire restores to its prestretched length at high speed when a current pulse of sufficient heating power is transmitted through the wire. The wire is stretched several percent when the shutter is cocked. Another wire is joined to the shutter and operated in opposition to the first wire whereby one of the wires is stretched when the other is unstretched. A current pulse through the stretched wire restores it to unstretched condition during which time it exerts sufficient tensile force to stretch the opposing wire.

5 Claims, 5 Drawing Figures

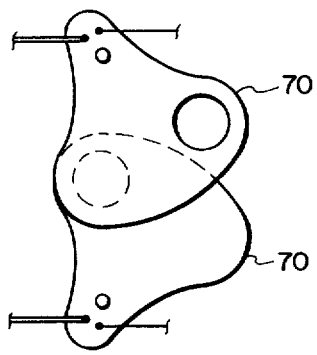
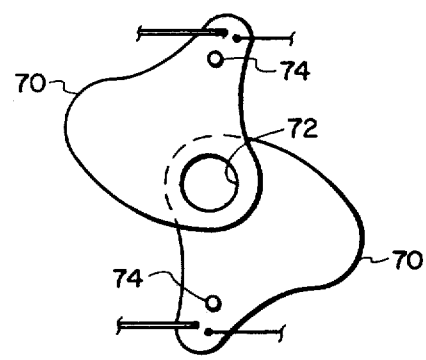
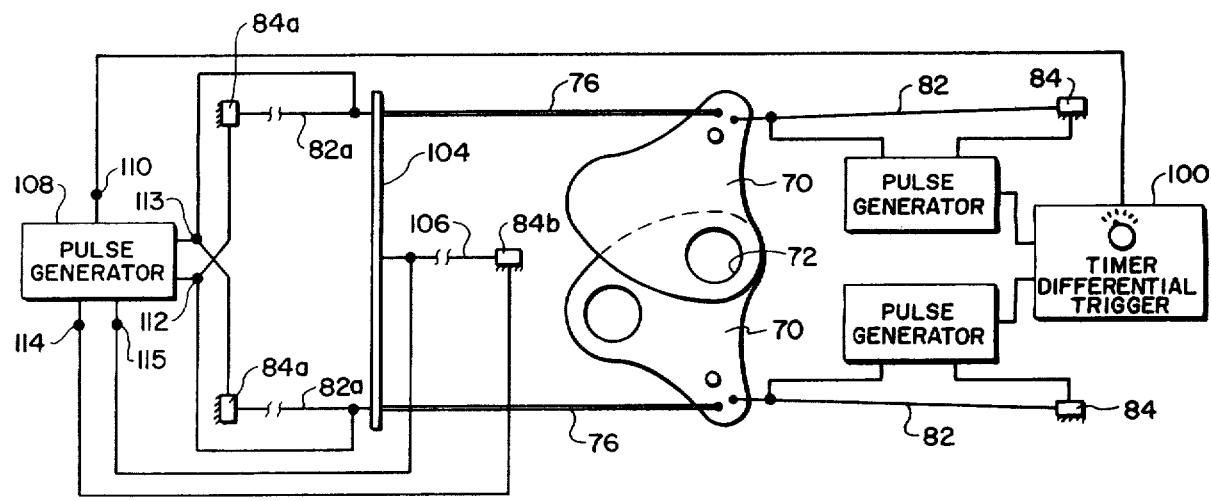

HIGH-SPEED SHUTTER

BACKGROUND OF THE INVENTION

In recent years an alloy of nickel and titanium of particular stoichiometric composition was developed that has memory of particular stable dimensions and a martensitic critical temperature at which the mechanical memory is activated. A length of wire of the alloy has the following characteristics: when tensile stress is applied to a length of the wire of stable dimension sufficient to stretch the wire up to near 10 percent of its length but not exceeding a predetermined maximum for the alloy and then the tensile stress is removed, the wire is dimensionally quiescent indefinitely at its stretched length provided that its temperature is not elevated to its martensitic critical temperature. When the temperature of the stretched wire is elevated to the martensitic critical temperature of the alloy, the wire dimension is substantially instantly restored to that prior to elongation and during the restoration the wire exhibits substantial tensile force. The rate of restoration can be varied by varying the rate at which the wire is heated when it is at its critical temperature. When the wire restores to its prestretched length it exhibits contraction force several times the tensile force required for stretching the wire at lower temperature. The martensitic critical temperature is related to the stoichiometric composition of the alloy. Alloys exhibiting the above property are described in the following prior art. U.S. Pat. Nos. 3,174,851 to Buehler; U.S. Pat. No. 3,403,238 to Buehler.

Wire Journal of June 1969 - "55-Nitinol, Unique Wire Alloy With a Memory" by W. J. Buehler and W. B. Cross The alloy 55-Nitinol includes titanium and nickel and has a particular martensitic critical temperature depending on composition and which temperature ranges upwardly from about 140 degrees F. A length of wire of 55-Nitinol, 0.020 inches in diameter, stretched to about 108 percent of its prestretched length, restores to its prestretched length when elevated to its martensitic critical temperature and exerts a tensile force that can be over 30 pounds. The wire has very little mass. If one end of the wire is fixed, the other end moves toward the fixed end during contraction with a peak speed on the order of 1,000 feet per second. The contraction speed depends upon the characteristic of the specific alloy and the rate at which the material is heated at its critical temperature.

SUMMARY OF THE INVENTION

A shutter mechanism is operated by one or more lengths of wire of the type that has a martensitic critical temperature, that can be stretched to a predetermined percentage of its unstretched length and be dimensionally quiescent at the stretched length after the tensile force is removed and when heated to its martensitic critical temperature restores to its prestretched length. If unrestrained, kinetic energy of deformation is released as the wire reverts to its unstretched length and the rate at which it is released is a function of the rate at which heat is provided within the wire when the martensitic critical temperature is reached. The wire may be single or multistrand. The shutter mechanism is cocked when the length of wire is stretched and is driven at high speed by the wire when the wire restores to its prestretched length. A current pulse is flowed through the wire to raise its temperature to its martensitic critical temperature. The current pulse may be obtained from a switch controlled power source, a charged capacitor unit, or a pulse generator. The wire is stretched either by a manually operated mechanical linkage or by another length of similar wire which is operated in opposition to the shutter activating wire.

DESCRIPTION OF THE FIGURES

FIG. 3 shows an instantaneous position of the shutter leaves of FIG. 2 when the shutter is fully open, FIG. 4 shows the shutter leaves of FIG. 2 in their end position at the end of a shutter operation, and FIG. 5 shows another embodiment.

Figure 1:
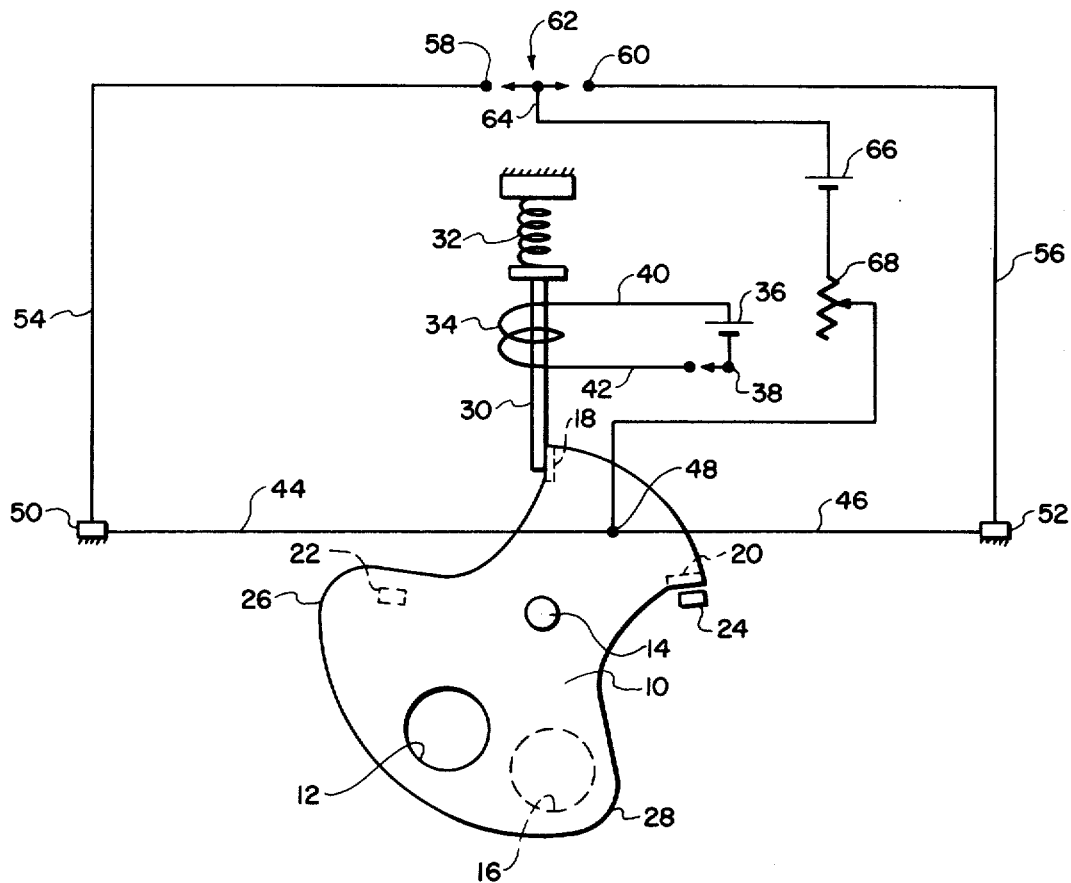
FIG. 1 shows an embodiment with basic aspects of this invention.

In the embodiment shown in FIG. 1, a lightweight leaf-like shutter 10 of opaque material with an aperture 12 is supported for angular movement on pivot 14 that is fixed to a camera structure or other optical structure, not shown, to intersect the path of light flux that passes through lens 16 carried by the structure. The shutter has rearwardly extending tabs 18, 20 for abutting stops 22, 24 carried by the structure and that define the limits of angular displacement of the shutter. The shutter aperture transmits light flux from lens 16 during a minor fraction of a full angular traverse of the shutter. When the shutter is in either end position, any light flux through the lens is blocked by the lateral ear 26 or 28 of the shutter leaf. A pawl 30 latches the leaf in one of its end positions when it projects in the path of tab 18 or 20. Compression spring 32 continuously urges the pawl into the path of the shutter 10. Conductor coil 34 surrounds the pawl, and is designed in combination with magnetic circuit means, not shown, to retract the pawl from interference with the shutter when the coil is energized. An electric supply 36 for supplying sufficient current to coil 34 to retract the pawl and a normally open switch are connected by conductor leads 40, 42 to the ends of coil 34. The switch may be a simple push button switch which can be held closed or a snap type that closes and opens when actuated.

Wires 44 and 46 of the alloy 55-Nitinol or equivalent are mechanically and electrically connected to the shutter 10 at a junction 48 and are operable for forcing the shutter to each of its end positions. In the symmetrical design shown in FIG. 1, the axes of the aperture 12, pivot 14 and junction 48 are spaced along the center of the shutter. Each wire has a memory and a martensitic critical temperature. The wire 46 is stretched from an initial length which is somewhat less than the distance between junction 48 and anchor 52 when the shutter is in its position shown in FIG. 1. In FIG. 1, wire 44 is stretched. The unstretched lengths of wires 44 and 46 are equal. Though not shown as such in FIG. 1, wire 44 is stretched on the order of several percent. An end of each wire 44 and 46 is secured in anchors 50 and 52 and is connected in electrical series with conductor leads 54 and 56 to the terminals 58, 60 of a single-pole double-throw switch 62. The movable contactor 64 of the switch is connected in series with an electric source 66, current limiting rheostat 68 and junction 48.

When stretched, the wire 44 or 46 has dimensional stability indefinitely until the temperature of the stretched wire is elevated above its martensitic critical temperature. When contactor 64 engages contact 58, the temperature of wire 44 is elevated above its martensitic critical temperature and the wire 44 tends to restore to its prestretched length and applies substantial force to junction 48 if the above critical temperature is sustained. If switch 38 is closed during this time, pawl 30 is retracted and tensile force in wire 44 is ample to cold stretch wire 46 and to move shutter 10 swiftly to stop 22. Because the unstretched length of wire 44 is less than the distance from the leftmost position of point 48 and anchor 50, force is applied to the shutter during the entire traverse between end positions. The speed at which shutter 10 is driven from the clockwise end position to the counterclockwise end position is affected by the rate at which wire 44 is heated when its temperature exceeds critical; the rheostat 68 can be used to adjust heating current through the wire. Though the embodiment in FIG. 1 has two shutter driving wires, one of the wires and its connecting lead can be replaced by a manual cocking means for stretching the shutter driving wire. While the pawl mechanism enables the shutter to be operated at a speed from end position to end position, that is repetitive by releasing the shutter after the wire is heated, the pawl mechanism may be omitted in a simple form of the equipment where this degree of accuracy is not required. Additionally, the illustrated circular geometry of aperture 12 may be substantially different than shown.

Figure 2:
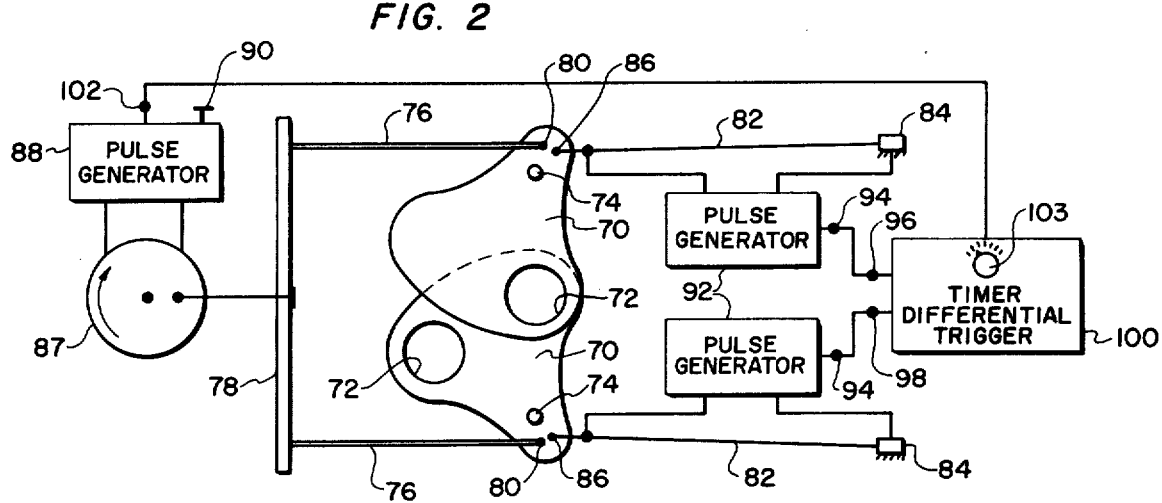
FIG. 2 shows a preferred embodiment of the invention.

The preferred embodiment shown in FIG. 2 has a pair of overlapping identical shutter leaves 70 each of which is operated in a manner similar to the shutter leaf in FIG. 1; the leaves are disposed in overlapping relation to block light flux from a lens system except when in a particular angular relationship. Each shutter leaf 70 has a light transmitting aperture 72 and is mounted on a pivot 74. The two pivots 74 are spaced twice the distance between the axis of the aperture and the axis of the pivot of one of the shutter leaves. A pair of shutter cocking tensioning elements 76 are connected at one of their ends to a crossbar 78 and at their other ends are linked to junctions 80 on the leaves 70 to apply leftwardly directed force only to the shutter leaves. Two wires 82 of 55-Nitinol are connected at one of their ends to electrically conductive anchors 84 and at their other ends are linked to junctions 86 on the leaves 70. A crank mechanism 87 that includes a solenoid is coupled to crossbar 78 and elements 76 for stretching the wires 82 and angularly displacing the outer ends of leaves 70 leftwardly and for sliding in the crossbar when moving rightwardly whereby no force is applied to the shutter leaves in the rightward direction. A current pulse generator 88 when activated by a manual switch 90 provides the energy required by the crank mechanism 86 to complete a cycle to stretch the wires 82 and to pull the outer ends of the shutter leaves to their leftmost positions as shown in FIG. 3 and then for sliding rightwardly in the crossbar. The cocking mechanism including elements 76, crossbar 78, crank 87, and pulse generator 88 are not intended in a limiting sense. Their function can be accomplished manually by applying leftwardly directed force to the crossbar or to the ends of elements 76 using any convenient force applying arrangement. During the time of resetting or cocking the shutter, the apertures do not overlap and no light flux is transmitted by the shutter.

Current pulse generators 92 with trigger-pulse input terminals 94 connected to distinct output terminals 96, 98 of a timer-differential-trigger circuit 100 that provides a pair of spaced trigger pulses when activated by an inpulse from terminal 102 of pulse generator 90 after the shutter is cocked. A timer adjust 103 is provided for adjusting the time interval between trigger pulses. The timer may be a monostable multivibrator wherein the ends of each pulse are differentiated and the pulse length is adjustable. The pulse generators 92 are connected across the wires 82 and supply current pulses to the wires of sufficient amplitude and time duration to elevate the temperature of the wires above their martensitic critical temperature to restore the wires to their prestretched lengths. Pulse generators 92 may be flip-flops or other common types.

In operation, first the lower wire 82 is caused to restore to its prestretched length; the lower shutter leaf is forced to the position shown in FIG. 4. At that time, the apertures 72 of both shutter leaves are in alignment with the lens behind the leaves. Then the upper wire 82 is caused to restore to its prestretched length; the upper shutter leaf is forced to the position shown in FIG. 3, closing the shutter. Open-close time of the shutter is dependent on the velocity of the shutter leaves and on the time differential imparted by timer 100. The timer adjust 103 adjusts pulse length and thus provides a range of shutter speeds. The timer differential trigger 100 may be a suitable electromechanical device for slower speed applications.

In FIG. 5, there is shown a modification of the shutter cocking mechanism employed in the combination of FIG. 2, and including a teaching shown in FIG. 1. Elements 76 that are nonstretch compared to wires 82 are connected to the shutter leaves 70 for applying tensile force as in FIG. 2. However, instead of a crank 86 or other mechanical device as in FIG. 2, a pair of wires 82a of 55-Nitinol identical to the wires 86 are connected betweeen conductive anchors 84a and a crossbar 104 which in turn is connected to the elements 76. Another wire 106 of 55-Nitinol identical to wires 82 and 82a is connected between a conductive anchor 84b and the center of crossbar 104. A pulse generator 108 has one output 110 that provides a trigger pulse to the timer differential trigger 100 as in FIG. 2, and in addition has a pair of output terminals 112, 113 for supplying a lengthrestoring current pulse to both wires 82a and another pair of terminals 114, 115 for supplying a length-restoring current pulse to wire 106. When the wires 82 are stretched the wire 106 is stretched and the wires 82a are unstretched and conversely when the wire 106 is unstretched and the wires 82 are unstretched, wires 82a are stretched. The wire 106 and the crossbar 104 are optional; the wires 82 could be relied upon to stretch the wires 82a. Since the contraction of wires 82 moves the shutter leaves 70 through positions where they pass a light beam, and loading of wires 82 with the stretching of wires 82a slows and otherwise affects accuracy of the operation of the shutter, the wire 106 is provided to minimize the tensile loading of wires 82.

The invention can be made to operate at a speed in excess of 1/4000 second because 55-Nitinol wire can produce extreme forces relative to the mass of the materials employed in the shutter. During contraction, the 55-Nitinol wire exhibits a speed at which the ends may approach at a speed on the order of 1000 feet per second. Since 55-Nitinol retains elongation stress indefinitely without any holding means, the shutter is lightweight and of simple construction. The invention can be made with an extremely large aperture for large aperture optics to accommodate a very long focal length lens system.

The invention has utility in mechanical devices for releasing kinetic energy under controlled conditions. For example high speed precise relays may be made embodying the teachings of this invention.

What is claimed is:

1. In a camera, a shutter mechanism comprising a shutter mounted in the camera for movement between two positions, a length of wire secured at one end to the camera and mechanically linked to the shutter at the other end for moving the shutter from one of its positions to its other position, said wire being of the type which when stretched is quiescent at its stretched length and has a memory for its prestretched length and is characterized by a martensitic critical temperature, shutter cocking means linked to said shutter for moving the shutter from its other position to its one position and for stretching said wire, said shutter cocking means including a second length of wire of the same kind of material as the first-recited wire and secured at one end to the camera and at its other end mechanically linked to the shutter said lengths of wire being oriented in opposition, and a current pulse generator connected to the second length of wire for producing a transient temperature rise in the second length of wire with a peak at least as high as its martensitic critical temperature and of sufficient persistence to return the latter to its prestretched length and to move the shutter to its one position and to stretch the first-recited wire.

2. In a camera, a shutter mechanism comprising two shutters each having an aperture, spaced pivots mounting the two shutters respectively so that their apertures are displaceable along arcuate paths along which the apertures can overlap, two lengths of wire for the shutters secured at one of their ends to the camera and at their other ends to the respective shutters, said wire being of the type which when stretched is quiescent at its stretched length and has a memory for its prestretched length and is characterized by a martensitic critical temperature, separate means for raising the temperature of each length of wire above its martensitic critical temperature, the shutter apertures being non overlapping when the two lengths of wire are unstretched, means for stretching both lengths of wire and for pivoting the shutters to cocked positions, the shutter apertures being non overlapping when the shutters are cocked, means for activating first one of said separate means and then the other of said separate means whereby the stretched lengths of wire are restored to unstretched lengths in succession and the respective shutters are pivoted in succession and during such pivotings the aperture of the second pivoted shutter passes across the aperture of the first pivoted shutter.

3. In a camera, a shutter mechanism as defined in claim 2 wherein said separate means are pulse generators connected across the lengths of wires and said means for activating is a differential trigger means coupled to the pulse generators.

4. In a camera, a shutter mechanism as defined in claim 3 wherein said means for stretching both lengths of wire and for pivoting the shutters to cocked positions includes two additional lengths of wire of said type secured to said camera and mechanically linked to said shutters in opposition to the first recited lengths of wire and being stretched and unstretched when the first recited lengths of wire are unstretched and stretched respectively, said means for stretching further including a pulse generator connected across both the second recited lengths of wire for heating both the latter concurrently above the martensitic critical temperature.

5. In a camera, a shutter mechanism as defined in claim 3 wherein said means for stretching both lengths of wire and for pivoting the shutters to cocked positions includes electrically energizable motor means linked to both shutters and a pulse generator for energizing said electrically energizable motor means.

* * * * *